(12) United States Patent
White

(10) Patent No.: US 9,166,425 B1
(45) Date of Patent: Oct. 20, 2015

(54) BATTERY CHARGING STORAGE DEVICE

(71) Applicant: Billy White, Kansas, OK (US)

(72) Inventor: Billy White, Kansas, OK (US)

( * ) Notice: Subject to any disclaimer, the term of this patent is extended or adjusted under 35 U.S.C. 154(b) by 307 days.

(21) Appl. No.: 13/934,948

(22) Filed: Jul. 3, 2013

(51) Int. Cl.
*H02J 7/00* (2006.01)

(52) U.S. Cl.
CPC .............. *H02J 7/0042* (2013.01); *H02J 7/0003* (2013.01)

(58) Field of Classification Search
CPC ...... Y02E 60/12; H02J 7/0042; H02J 7/0003; H02J 7/0044; H02J 7/0045; H01M 10/46; H01M 10/44; H01M 2/1022; H01M 2220/30; H01M 2/105; H01M 2/10; H01M 2/12; H01M 2/1094; H01R 13/6675; B65D 85/00; B65D 85/88; B65D 73/00; B65D 75/24; B65D 2585/88; A45C 11/00; A45C 13/02; A45C 3/00
USPC .............. 320/110, 116, 107, 113; 429/96, 99, 429/100; D13/103, 107, 119; D3/294, 295, D3/284, 313, 283, 273, 274, 276, 103
See application file for complete search history.

(56) References Cited

U.S. PATENT DOCUMENTS

| | | | | |
|---|---|---|---|---|
| 1,749,983 A | * | 3/1930 | Nelson | 292/281 |
| 3,209,230 A | * | 9/1965 | Mas | 320/110 |
| 3,217,227 A | * | 11/1965 | Sherwood | 320/110 |
| D214,732 S | * | 7/1969 | Dalley | D13/107 |
| 3,579,075 A | * | 5/1971 | Floyd | 320/110 |
| 3,969,796 A | * | 7/1976 | Hodsdon et al. | 24/270 |
| 4,303,876 A | * | 12/1981 | Kelly et al. | 320/110 |
| 4,331,356 A | * | 5/1982 | Noel | 292/281 |
| D267,834 S | * | 2/1983 | Yew | D3/203.7 |
| 4,403,182 A | * | 9/1983 | Yeh | 320/110 |
| D272,041 S | * | 1/1984 | Harris et al. | D8/330 |
| D278,703 S | * | 5/1985 | Chiodo et al. | D13/107 |
| 4,535,863 A | * | 8/1985 | Becker | 180/68.5 |
| D281,836 S | * | 12/1985 | Sparkman | D3/203.7 |
| 4,556,187 A | * | 12/1985 | McLin | 248/503 |
| 4,766,361 A | * | 8/1988 | Pusateri | 320/110 |
| 4,816,735 A | * | 3/1989 | Cook et al. | 320/110 |
| D301,575 S | * | 6/1989 | Crawford, Jr. | D13/119 |
| 5,039,929 A | * | 8/1991 | Veistroffer et al. | 320/107 |
| 5,057,761 A | * | 10/1991 | Felegyhazi, Sr. | 320/110 |
| 5,140,744 A | * | 8/1992 | Miller | 29/730 |
| D332,442 S | * | 1/1993 | Simpson, Sr. | D13/119 |
| 5,198,638 A | * | 3/1993 | Massacesi | 219/209 |
| 5,260,636 A | * | 11/1993 | Leiserson et al. | 320/112 |
| D351,503 S | * | 10/1994 | Bach | D3/273 |
| D352,927 S | * | 11/1994 | Williams | D13/107 |
| 5,366,827 A | * | 11/1994 | Belanger et al. | 429/99 |
| 5,403,679 A | * | 4/1995 | Stone | 429/99 |

(Continued)

*Primary Examiner* — Drew A Dunn
*Assistant Examiner* — John Trischler

(57) ABSTRACT

A battery charging storage device charges and stores batteries in a compact lockable case. The device includes a housing having a bottom wall and a perimeter wall defining an interior space. A medial wall extends through the interior space of the housing. Straight interior walls extend upwardly from the medial wall defining a plurality of rows in the interior space. A top surface of the medial wall conforms to an exterior shape of a plurality of batteries positioned end to end within each row in the interior space. Charging walls extend across associated rows defining a plurality of individual compartments. Contact sets are coupled to the charging walls with each contact set corresponding to an associated one of the compartments in the interior space. Wiring couples each contact set to a plug electrically wherein each contact sets is configured to provide electrical current to a battery positioned in the associated compartment.

6 Claims, 5 Drawing Sheets

(56) References Cited

U.S. PATENT DOCUMENTS

| | | | |
|---|---|---|---|
| 5,426,358 A * | 6/1995 | Leiserson et al. | 320/112 |
| 5,456,506 A * | 10/1995 | Bartlett | 292/281 |
| 5,543,702 A * | 8/1996 | Pfeiffer | 320/110 |
| D375,934 S * | 11/1996 | Rosen et al. | D13/107 |
| D376,690 S * | 12/1996 | Lockerby | D3/284 |
| 5,606,238 A * | 2/1997 | Spellman et al. | 320/110 |
| D380,611 S | 7/1997 | Mancusi | |
| 5,654,870 A * | 8/1997 | Havener | 361/600 |
| 5,665,486 A * | 9/1997 | Stocchiero | 429/100 |
| 5,670,268 A * | 9/1997 | Mancusi | 429/9 |
| 5,686,811 A * | 11/1997 | Bushong et al. | 320/110 |
| 5,780,992 A * | 7/1998 | Beard | 320/106 |
| 5,806,948 A * | 9/1998 | Rowan et al. | 312/293.3 |
| 5,872,831 A * | 2/1999 | Zoiss et al. | 379/21 |
| 5,959,434 A * | 9/1999 | Park et al. | 320/113 |
| D422,964 S * | 4/2000 | Lam | D13/107 |
| D433,629 S * | 11/2000 | Clarke et al. | D9/415 |
| 6,152,303 A * | 11/2000 | Ducote et al. | 206/703 |
| 6,218,796 B1 * | 4/2001 | Kozlowski | 318/280 |
| 6,498,457 B1 * | 12/2002 | Tsuboi | 320/110 |
| D468,688 S * | 1/2003 | Helman | D13/119 |
| 6,630,812 B1 * | 10/2003 | Davis | 320/116 |
| D490,375 S * | 5/2004 | Pomerance | D13/119 |
| 6,730,432 B1 * | 5/2004 | Grosfeld et al. | 429/97 |
| 6,841,293 B1 * | 1/2005 | Dreulle et al. | 429/99 |
| D517,987 S * | 3/2006 | Castagnola et al. | D13/119 |
| 7,014,946 B2 * | 3/2006 | Partington et al. | 429/99 |
| 7,160,113 B2 * | 1/2007 | McConnell et al. | 434/365 |
| 7,445,300 B2 * | 11/2008 | Collins et al. | 312/249.8 |
| 7,468,596 B2 * | 12/2008 | Shum | 320/110 |
| D591,674 S * | 5/2009 | McConnell | D13/107 |
| 7,597,199 B1 | 10/2009 | Rochelo | |
| D604,142 S * | 11/2009 | Ayrest | D8/343 |
| D605,587 S * | 12/2009 | Nomi et al. | D13/107 |
| 7,709,138 B2 | 5/2010 | Flaugher | |
| 7,750,598 B2 * | 7/2010 | Hoffman et al. | 320/107 |
| D624,016 S * | 9/2010 | Seehoff et al. | D13/119 |
| 7,816,886 B2 * | 10/2010 | Brandon et al. | 320/110 |
| 7,838,142 B2 * | 11/2010 | Scheucher | 429/99 |
| 7,956,573 B1 * | 6/2011 | Rosen | 320/110 |
| 8,267,252 B2 * | 9/2012 | Foreman et al. | 206/703 |
| 8,274,256 B2 * | 9/2012 | Brandon et al. | 320/112 |
| 8,362,745 B2 * | 1/2013 | Tinaphong | 320/108 |
| 8,593,102 B2 * | 11/2013 | McGuire et al. | 320/101 |
| 8,659,264 B2 * | 2/2014 | Brandon et al. | 320/112 |
| 8,872,482 B2 * | 10/2014 | Jung | 320/138 |
| 2002/0000786 A1 * | 1/2002 | Choi et al. | 320/112 |
| 2003/0141842 A1 * | 7/2003 | Izawa et al. | 320/116 |
| 2004/0214052 A1 | 10/2004 | Rochelo | |
| 2005/0156566 A1 * | 7/2005 | Thorsoe et al. | 320/116 |
| 2006/0071641 A1 * | 4/2006 | Ward | 320/116 |
| 2007/0273326 A1 * | 11/2007 | Krieger et al. | 320/110 |
| 2008/0185992 A1 * | 8/2008 | Hoffman et al. | 320/110 |
| 2008/0203968 A1 * | 8/2008 | Campbell | 320/116 |
| 2008/0268113 A1 | 10/2008 | Kadowaki et al. | |
| 2009/0321304 A1 | 12/2009 | Watson et al. | |
| 2010/0253519 A1 * | 10/2010 | Brackmann et al. | 340/572.1 |
| 2011/0058312 A1 * | 3/2011 | Prax et al. | 361/641 |
| 2012/0006719 A1 | 1/2012 | Celona et al. | |
| 2012/0262116 A1 * | 10/2012 | Ferber et al. | 320/111 |
| 2012/0262117 A1 * | 10/2012 | Ferber et al. | 320/111 |
| 2014/0002004 A1 * | 1/2014 | Farris-Gilbert et al. | 320/103 |
| 2015/0072208 A1 * | 3/2015 | Balk et al. | 429/121 |

* cited by examiner

BATTERY CHARGING STORAGE DEVICE

BACKGROUND OF THE DISCLOSURE

Field of the Disclosure

The disclosure relates to storage devices and more particularly pertains to a new storage device for charging and storing batteries in a compact easily transported lockable case.

SUMMARY OF THE DISCLOSURE

An embodiment of the disclosure meets the needs presented above by generally comprising a housing having a bottom wall and a perimeter wall defining an interior space. A medial wall extends through the interior space of the housing. Straight interior walls extend upwardly from the medial wall defining a plurality of rows in the interior space. A top surface of the medial wall conforms to an exterior shape of a plurality batteries positioned end to end within each row in the interior space. Charging walls extend across associated rows defining a plurality of individual compartments. Contact sets are coupled to the charging walls with each contact set corresponding to an associated one of the compartments in the interior space. Wiring couples each contact set to a plug electrically wherein each contact sets is configured to provide electrical current to a battery positioned in the associated compartment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
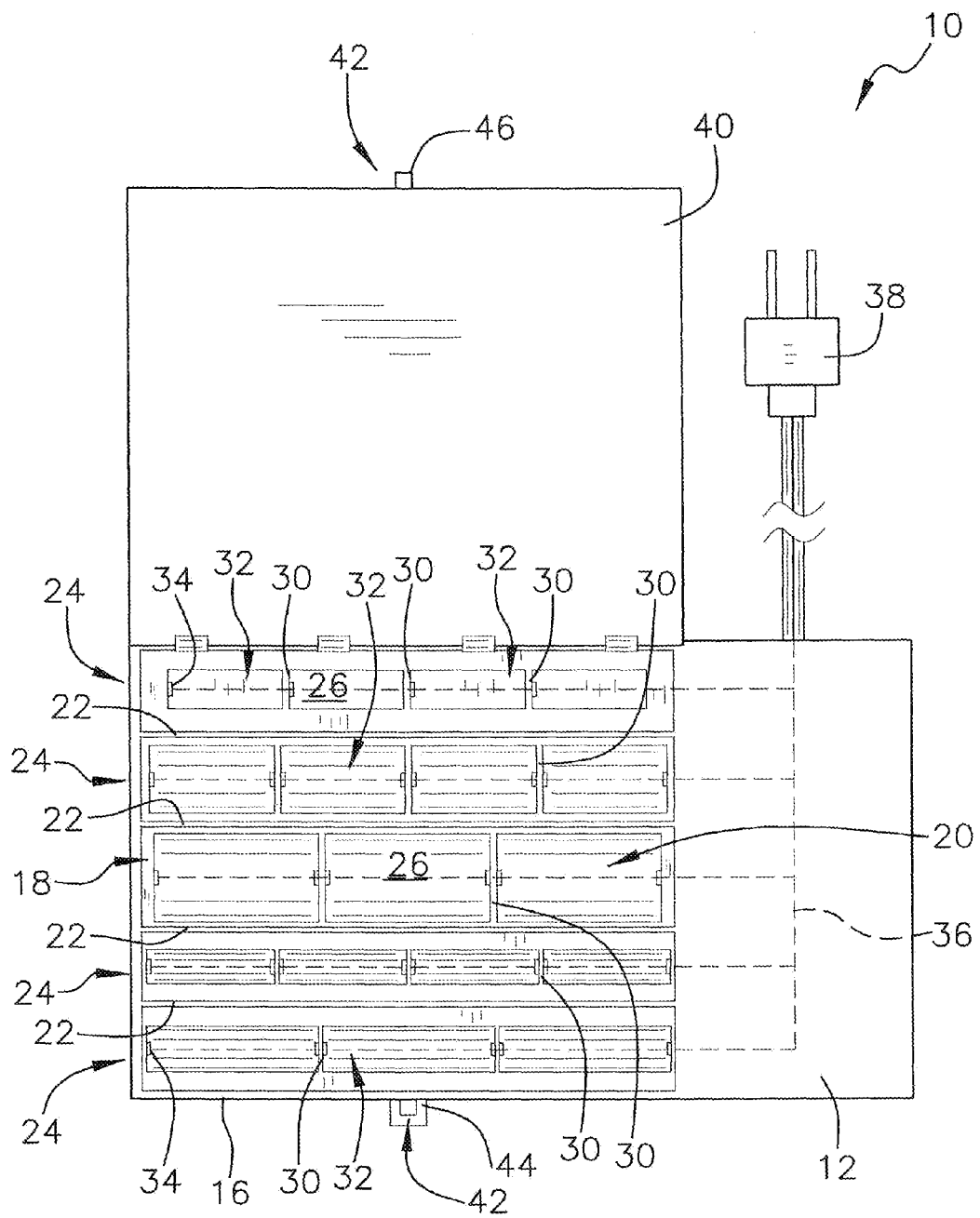
FIG. 1 is a top view of a battery charging storage device according to an embodiment of the disclosure.
Figure 2:
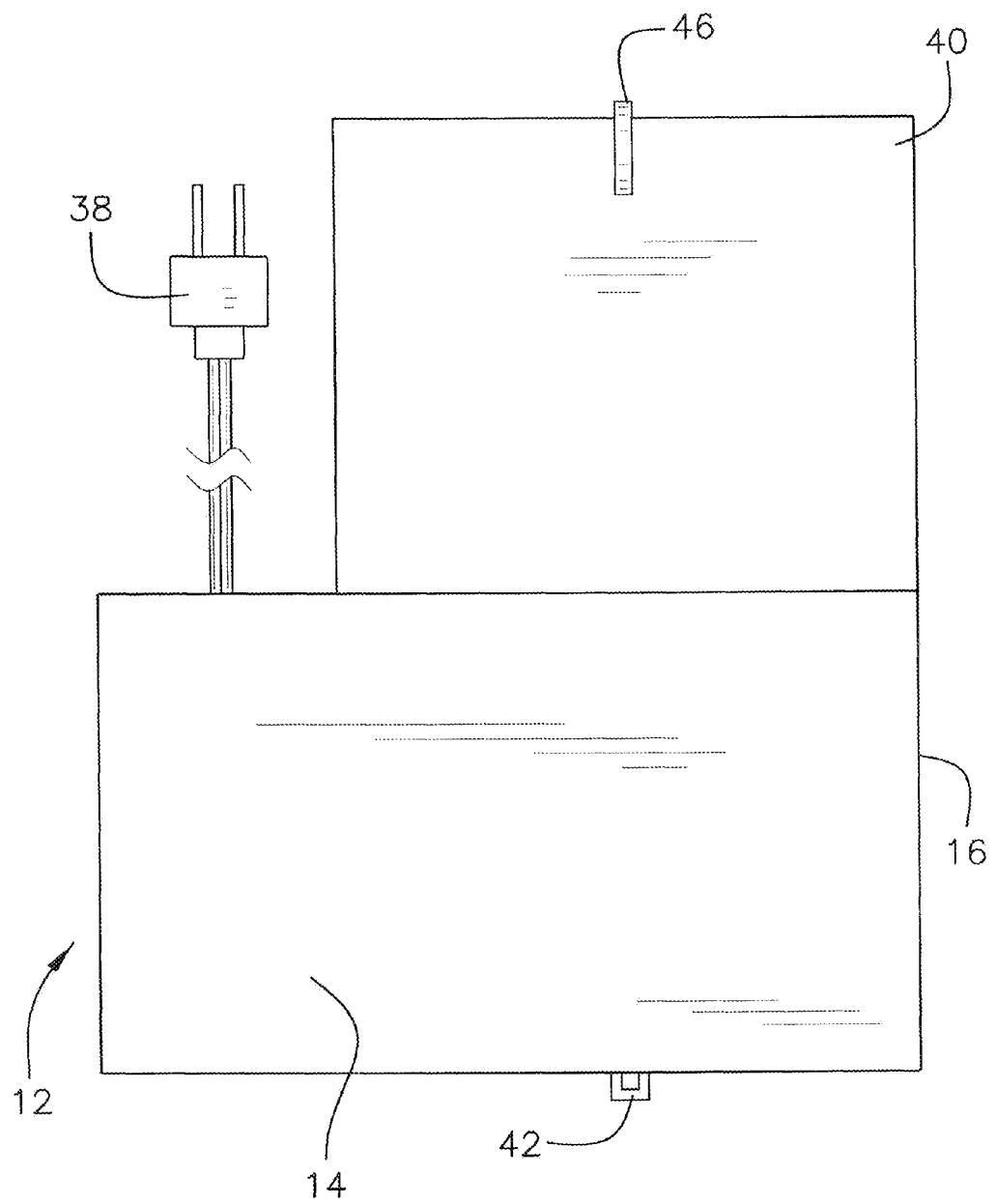
FIG. 2 is a bottom view of an embodiment of the disclosure.
Figure 3:
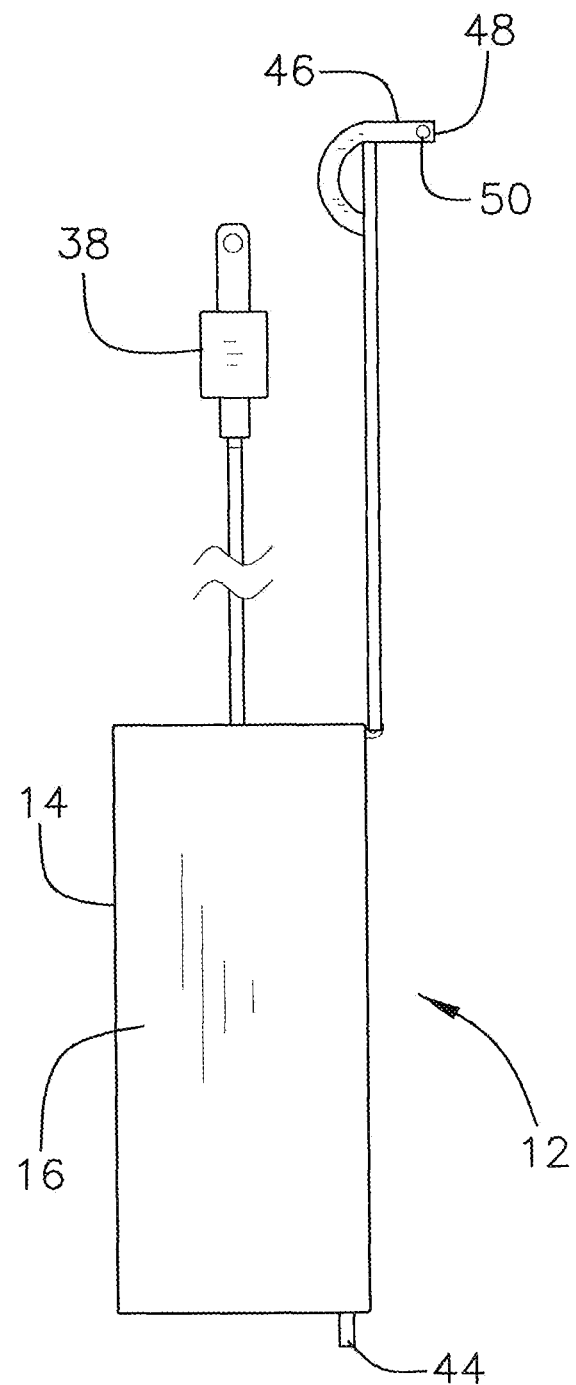
FIG. 3 is a side view of an embodiment of the disclosure.
Figure 4:
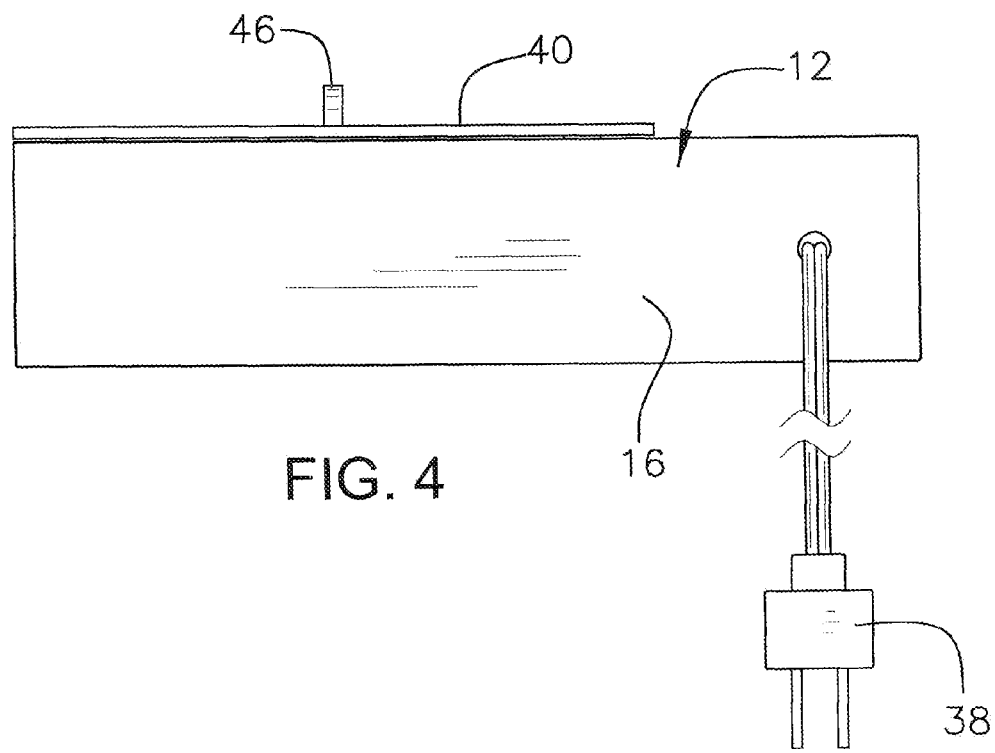
FIG. 4 is a back view of an embodiment of the disclosure.
Figure 5:
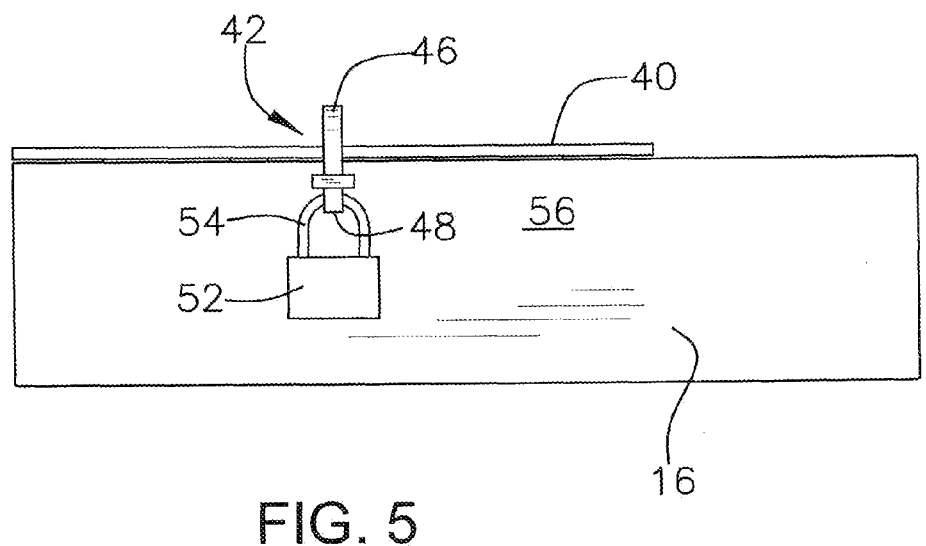
FIG. 5 is a front view of an embodiment of the disclosure.
Figure 6:
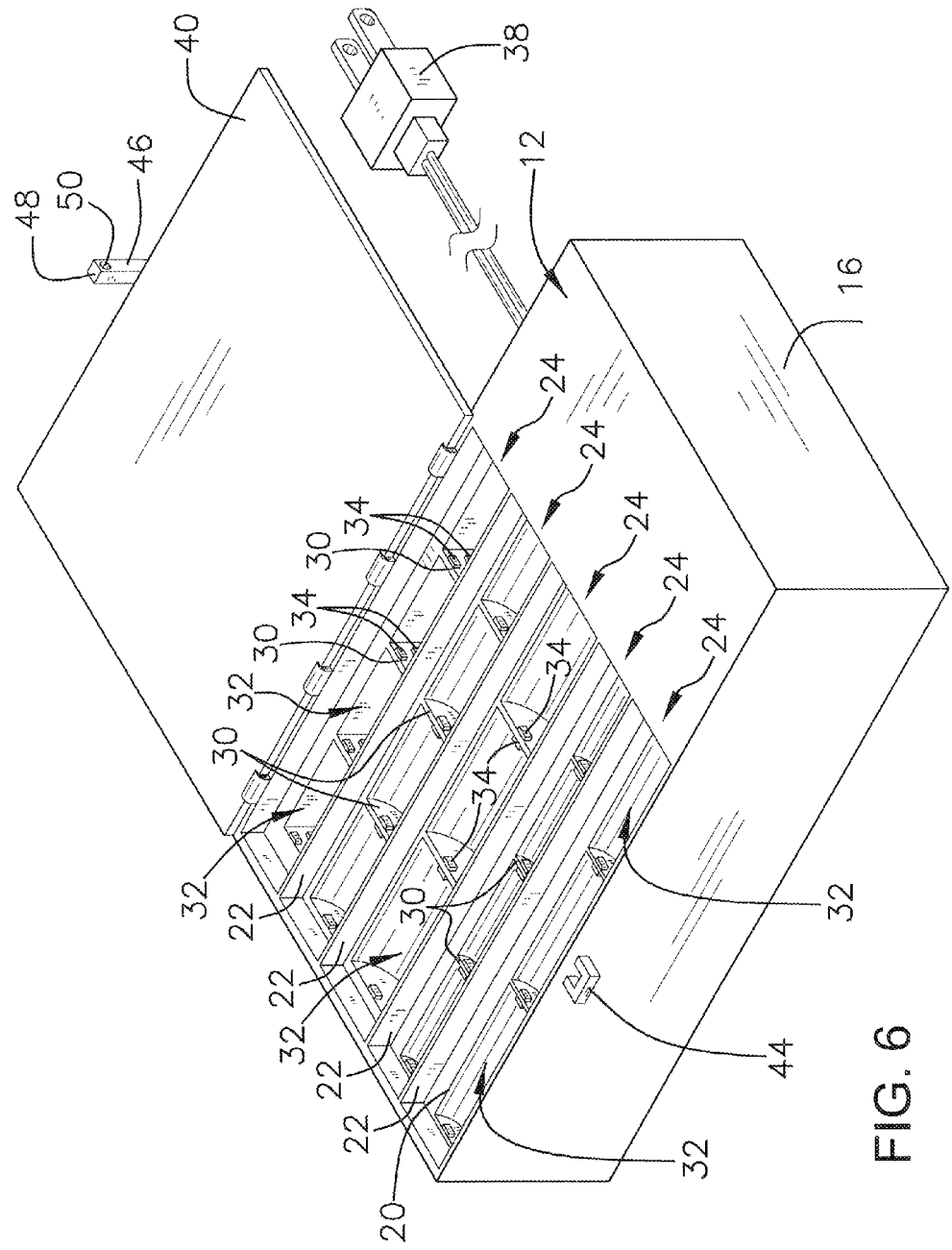
FIG. 6 is a top front side perspective view of an embodiment of the disclosure.

With reference now to the drawings, and in particular to FIGS. 1 through 6 thereof, a new storage device embodying the principles and concepts of an embodiment of the disclosure and generally designated by the reference numeral 10 will be described.

As best illustrated in FIGS. 1 through 6, the battery charging storage device 10 generally comprises a housing 12 having a bottom wall 14 and a perimeter wall 16 coupled to and extending upwardly from the bottom wall 12. The bottom wall 14 and the perimeter wall 16 define an interior space 18 of the housing 12. A medial wall 20 is coupled to the housing 12 extending through the interior space 18 of the housing 12. Each of a plurality of straight interior walls 22 extends upwardly from the medial wall 20 and across the interior space 18 in parallel relationship to each other interior wall 22. Thus, the straight interior walls 22 define a plurality of rows 24 in the interior space 18.

A top surface 26 of the medial wall 20 may be curved along a longitudinal length of associated rows 24 such that the top surface 26 is shaped to conform to a curved exterior shape of a plurality of cylindrical batteries positioned end to end within each associated row 24 in the interior space 18. Each row 24 extending through the interior space 18 may be configured for holding an associated battery size unique to the row 24. The top surface 26 of the medial wall 20 may also include a flat portion extending along an associated one of the rows 24 to accommodate holding a row of batteries having a planar exterior surface.

Each of a plurality of charging walls 30 is positioned in and extends across an associated row 24 in the interior space 18 defining a plurality of individual compartments 32 in the interior space 18. Each of a plurality of contact sets 34 is coupled to an associated one of the charging walls 30 such that each contact set 34 corresponds to an associated one of the compartments 32 in the interior space 18. Wiring 36 is coupled to each contact set 34. A plug 38 is electrically coupled to the wiring 36 wherein each contact sets 34 provides electrical current to a battery positioned in the associated compartment 32. Thus, rechargeable batteries may be stored and charged while in the compartments 32.

A lid 40 is coupled to the housing 12. The lid may comprise a partial face of the housing 12 or a full face of the housing 12. The lid 40 encloses the interior space 18 in combination with the housing 12 when the lid 40 is positioned in a closed position. A latch 42 is provided having a loop section 44 coupled to an exterior surface 56 of the perimeter wall 16 of the housing 12. The latch 42 further has an elongated bar section 46 coupled to and extending from the lid 40. The bar may have a rectangular cross-sectional shape transverse to a longitudinal axis of the bar section 46. A distal end 48 of the bar section 46 extends through the loop section 44 of the latch 42 when the lid 40 is in the closed position. An aperture 50 extends through the bar section 46 proximate the distal end 48 of the bar section 46. A lock 52 having a shank 54 is extendable through the aperture 50 wherein the shank 54 inhibits the bar section 46 from being removed from the loop section 44. Thus, the housing 12 may be locked to prevent unauthorized access to batteries in the interior space 18. Locking of the lid 40 covering the housing 12 further permits easy transport of the housing 12 while holding batteries.

In use, batteries are positioned in the compartments 32 and the plug 38 coupled to an electrical source to charge batteries held in the housing 12. The lid 40 may be locked to prevent theft of individual batteries from the housing 12 while the batteries are charged. The lid 40 may also be left in the closed position and locked into place to facilitate carrying of the housing 12 to transport batteries as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A battery charging storage device comprising:
   a housing having a bottom wall, a perimeter wall coupled to and extending upwardly from said bottom wall, said bottom wall and said perimeter wall defining an interior space of said housing;
   a medial wall coupled to said housing, said medial wall extending through said interior space of said housing;
   a plurality of straight interior walls extending upwardly from said medial wall and across said interior space of said housing wherein said straight interior walls define a plurality of rows in said interior space;
   a top surface of said medial wall being shaped to conform to an exterior shape of a plurality batteries positioned end to end within each said row in said interior space;
   a plurality of charging walls, each charging wall being positioned in and extending across an associated row in said interior space defining a plurality of individual compartments in said interior space;
   a plurality of contact sets, each contact set being coupled to an associated one of said charging walls, each contact set corresponding to an associated one of said compartments in said interior space;
   wiring coupled to each said contact set; and
   a plug electrically coupled to said wiring wherein each said contact sets is configured to provide electrical current to a battery positioned in said associated compartment.

2. The device of claim 1, further comprising a lid coupled to said housing, said lid enclosing said interior space with said housing when said lid is positioned in a closed position.

3. The device of claim 2, further comprising a latch having a loop section coupled to an exterior surface of said perimeter wall of said housing, said latch having a bar section coupled to and extending from said lid, a distal end of said bar section extending through said loop section of said latch when said lid is in said closed position.

4. The device of claim 3, further comprising:
   an aperture extending through said bar section proximate said distal end of said bar section; and
   a lock having a shank extendable through said aperture wherein said shank inhibits said bar section from being removed from said loop section.

5. The device of claim 1, further comprising each said row extending through said interior space being configured for holding an associated battery size unique to said row.

6. A battery charging storage device comprising:
   a housing having a bottom wall, a perimeter wall coupled to and extending upwardly from said bottom wall, said bottom wall and said perimeter wall defining an interior space of said housing;
   a medial will coupled to said housing, said medial wall extending through said interior space of said housing;
   a plurality of straight interior walls extending upwardly from said medial wall and across said interior space of said housing wherein said straight interior walls define a plurality of rows in said interior space;
   a top surface of said medial wall being shaped to conform to an exterior shape of a plurality batteries positioned end to end within each said row in said interior space, each said row extending through said interior space being configured for holding an associated battery size unique to said row;
   a plurality of charging walls, each charging wall being positioned in and extending across an associated row in said interior space defining a plurality of individual compartments in said interior space;
   a plurality of contact sets, each contact set being coupled to an associated one of said charging walls, each contact set corresponding to an associated one of said compartments in said interior space;
   wiring coupled to each said contact set;
   a plug electrically coupled to said wiring wherein each said contact sets is configured to provide electrical current to a battery positioned in said associated compartment;
   a lid coupled to said housing, said lid enclosing said interior space with said housing when said lid is positioned in a closed position;
   a latch having a loop section coupled to an exterior surface of said perimeter wall of said housing, said latch having a bar section coupled to and extending from said lid, a distal end of said bar section extending through said loop section of said latch when said lid is in said closed position;
   an aperture extending through said bar section proximate said distal end of said bar section; and
   a lock having a shank extendable through said aperture wherein said shank inhibits said bar section from being removed from said loop section.

\* \* \* \* \*